United States Patent Office

3,629,464
Patented Dec. 21, 1971

3,629,464
SYNERGISTIC ANTIMICROBIAL COMPOSITIONS COMPRISING CERTAIN ALIPHATIC MONO OR DIALDEHYDES AND AN ALIPHATIC NITRO-ALCOHOL
Heinz Günter Nosler, Monheim, Rhineland, Horst Bellinger, Dusseldorf, and Richard Wessendorf, Hilden, Rhineland, Germany, assignors to Henkel & Cie, G.m.b.H., Dusseldorf-Holthausen, Germany
No Drawing. Filed Mar. 1, 1968, Ser. No. 709,835
Claims priority, application Germany, Aug. 19, 1967,
H 63,652
Int. Cl. A01n 9/24
U.S. Cl. 424—334                                    9 Claims

ABSTRACT OF THE DISCLOSURE

Synergistic antimicrobic compositions of lower aliphatic mono and polyaldehydes and an aliphatic alcohol having 2 to 5 carbon atoms in a straight chain and substituted with at least one nitro group and a method of killing fungi and bacteria.

PRIOR ART

Lower aliphatic aldehydes, particularly formaldehyde, have a good disinfectant activity and have been used extensively in all kinds of antimicrobic compositions for preservation and antiseptic cleaning. However, the said aldehydes do have disadvantages such as unpleasant odors, strong irritations and/or changes in the articles treated which occasionally prevent their use in adequate concentration for full antimicrobic effect. Moreover, the antimicrobic activity of the aldehyde may be reduced by other components of the composition so that higher amounts of aldehyde are required than ordinarily but these higher concentrations cannot always be used due to the side effects of the aldehydes.

OBJECTS OF THE INVENTION

It is an object of the invention to provide synergistic antimicrobic compositions in which the amount of aldehyde component can be reduced.

It is another object of the invention to provide an improved method of killing bacteria and fungi.

These and other objects and advantages of the invention will become obvious from the following detailed description.

THE INVENTION

The synergistic antimicrobic compositions of the invention are comprised of an aliphatic mono- or dialdehyde having 1 to 6 carbon atoms and at least one straight chain aliphatic alcohol of 2 to 5 carbon atoms having at least one nitro and which may be substituted with a substituent selected from the group consisting of halogens, lower alkyl, hydroxy lower alkyl, phenyl, halophenyl and nitrophenyl. The weight ratio of aldehyde to nitro alcohol is preferably 50:1 to 1:40, depending upon the specific nitro alcohol and aldehyde.

The nitro alcohols of the compositions of the invention may be any of the known nitro alcohols having bactericidal and fungicidal activity and may have 1 to 4 hydroxy groups. The nitro alcohols substituted with chlorine and/or bromine have an exceptionally high degree of effectiveness in the compositions giving effective bactericidal and fungicidal activity at very low concentrations.

Examples of suitable nitro alcohols for the invention are 2-nitro-ethanol-(1),
2-bromo-2-nitro-ethanol-(1),
2-nitro-propanediol-(1,3-),
2-ethyl-2-nitro-propanediol-(1,3),
2-hydroxy-methyl-2-nitro-propanediol-(1,3),
2-bromo-2-nitro-propanol-(1),
1-nitro-3,3,3-trichloro-propanol-(2),
2-bromo-2-nitro-propanediol-(1,3),
2-chloro-2-nitro-propanediol-(1,3),
1-bromo-1-nitro-3,3,3-trichloro-propanol-(2),
2-bromo-2-nitro-1-phenyl-propanediol-(1,3),
2-bromo-2-nitro-1-(p-nitro-phenyl)-propanediol-(1,3),
2-bromo-2-nitro-(o-chlorophenyl)-propanediol-(1,3),
2-bromo-2-nitro-butanol-(1),
3-bromo-3-nitrobutanol-(2),
3-nitro-1,1,1-trichloropentanol-(2).

Particularly preferred is 1-bromo-1-nitro-3,3,3-trichloropropanol (2).

The antimicrobic aldehydes of the compositions of the invention are aliphatic aldehydes of 1 to 6 carbon atoms. Examples of suitable alkyl aldehydes are formaldehyde, acetaldehyde, propionaldehyde, butylaldehyde, valeraldehyde, glyoxal, succinaldehyde, adipaldehyde, glutaraldehyde. Formaldehyde is preferred due to its particularly high activity.

The ratio of aldehyde to nitro alcohol will vary depending upon the specific use of the antimicrobic compositions. Therefore, where the disadvantageous characteristics of the aldehyde act in a particularly disturbing manner, as small as possible an amount of the aldehyde should be used which reduction can be effected by increasing the amount of nitro alcohol. In many cases, because of the cost of the nitro alcohols, a lesser increase in activity may have to be accepted as satisfactory, and larger quantities of aldehydes may be used in the antimicrobic compositions.

The antimicrobic compositions of the invention may be used for the same purposes as the nitro alcohols or aldehydes per se such as antimicrobic detergents for hands, textiles, floors, hospital equipment and instruments, antimicrobic washing agents for hair and body, cleansing, disinfectant and preserving agents for industrial plants, such as dairies, breweries and laundries. The synergistic activity of the compositions of the invention allows use of lower concentrations of nitro alcohols without diminished antimicrobic activity which is particularly significant where increased concentrations of the nitro alcohols could cause harmful or unpleasant effects as in body detergents.

In the following examples there are described several preferred embodiments to illustrate the invention. However, it should be understood that the invention is not intended to be limited to the specific embodiments.

EXAMPLE I 208 gm. (1 mole) of 1-nitro-3,3,3-trichloropropanol-(2) were dissolved in 250 ml. of ethanol and the resulting solution was admixed with a solution of 23.0 gm. of sodium in 500 ml. of ethanol while stirring. The temperature was kept below 5° C. and then the precipitated sodium salt was separated and dried in vacuo to obtain 98.5% of the said salt, 210 gm. (0.91 mole) of the said sodium salt were suspended in 500 ml. of ether and 145.5 gm. (0.91 mole or 49.5 ml.) of bromine were admixed therewith with stirring. The reaction solution was filtered from the precipitated sodium bromide and after the ether had been removed, 247.6 gm. of raw product remained which by distillation in vacuo gave 227.5 gm. (79% yield) of 1-bromo-1-nitro-3,3,3-trichloropropanol-(2) having a boiling point of 136–137° C. at 12 mm. Hg.

EXAMPLE II

Antimicrobic activity

The threshold concentrations of the nitro aliphatic alcohols of Table I and the aldehydes of Table II, individually and together, were determined by the so-called plate test. This variation of the dilution test for chemical disinfectants set up by Deutsche Gesellschaft für Hygiene und Mikrobiologie has the advantage of using a solid culture media instead of a liquid culture media. Solid culture media have the advantage of being able to easily discover the effectiveness, particularly for fungicides.

The desired test concentrations were prepared by mixing specific amounts of the substance solutions of suitable concentrations with specific amounts of liquid bouillon or beer wort agars, in sterile petri-dishes. The amounts, measured with a pipette, of the substance solutions were a maximum of 0.1 to 1 ml. and the total volume in the petri-dishes after admixing with the culture media amounted to 10 ml. After solidification of the culture media, its surface was inoculated with the test germ suspension in bouillon or wort, which contained about $10^3$ germs per ml. The incubation took place at 37° C., or at 30° C. in the incubator, and lasted 8 days when bacteria or *Candida albicans* were employed. When epidermophyton Kaufmann-Wolf were used, it lasted 21 days. The duration of incubation of 21 days for epidermophyton Kaufmann-Wolf was chosen to conform to the above standard test, because in the evaluation of disinfectants against fungi of the epithelium a substance is considered as suitable when the growth of the fungi after predetermined duration of action is delayed by at least 21 days. Therefore, it was ascertained which of the substance concentrations worked into the culture media was just about capable to arrest the growth of the test germs completely. This value thus ascertained was indicated as threshold concentration. The tests were carried out in the following concentration intervals: 10,000, 5,000, 2,500, 1,000, 750, 500, 250, 100, 50, 25, 10, 5, 2.5, 1, 0.5, 0.25 and 0.1 p.p.m. The test results are shown in Table III.

TABLE I.—NITROALCOHOLS

E—2-ethyl-2-nitro-propanediol-(1,3)
F—2-hydroxymethyl-2-nitro-propanediol-(1,3)
G—2-bromo-2-nitropropanol-(1)
H—2-bromo-2-nitro-propanediol-(1,3)
I—1-bromo-1-nitro-3,3,3-trichloropropanol-(2)
K—2-bromo-2-nitro-1-phenyl-propanediol-(1,3)
L—2-bromo-2-nitro-1-(p-nitrophenyl)-propanediol-(1,3)
M—2-bromo-2-nitro-1-(o-chlorophenyl)-propanediol-(1,3)
N—2-bromo-2-nitro-butanol-(1)

TABLE II.—ALDEHYDES

A—Formalin (35% formaldehyde solution by weight)
B—Acetaldehyde
C—Glutaraldehyde
D—Glyoxal

TABLE III

| Test germ | Aldehyde | Threshold concentration of aldehyde in p.p.m. | Nitro-alcohol | Threshold concentration of nitroalcohol in p.p.m. | Aldehyde and nitroalcohol in p.p.m. | Ratio of aldehyde to nitroalcohol |
|---|---|---|---|---|---|---|
| Sta. aureus | A | 750 | E | 1,000 | 250+250 | 1:1 |
|  |  |  | F | 250 | 250+50 | 5:1 |
|  |  |  | G | 100 | 100+50 | 2:1 |
|  |  |  | H | 100 | 250+10 | 25:1 |
|  |  |  | I | 25 | 100+5 | 20:1 |
|  |  |  | K | 100 | 250+5 | 50:1 |
|  |  |  | L | 100 | 100+25 | 4:1 |
|  |  |  | M | 100 | 100+10 | 10:1 |
|  |  |  | N | 100 | 100+25 | 4:1 |
|  | B | 500 | I | 25 | 250+5 | 50:1 |
|  | C | 1,000 | G | 100 | 500+50 | 10:1 |
|  | D | 250 | H | 100 | 100+25 | 4:1 |
| E. coli | A | 500 | F | 100 | 100+50 | 2:1 |
|  |  |  | G | 50 | 100+25 | 4:1 |
|  |  |  | H | 50 | 250+10 | 25:1 |
|  |  |  | H | 50 | 50+50 | 1:1 |
|  |  |  | I | 25 | 100+5 | 10:1 |
|  |  |  | I | 25 | 250+2.5 | 50:1 |
|  |  |  | K | 100 | 250+10 | 25:1 |
|  |  |  | N | 50 | 50+50 | 1:1 |
|  | B | 500 | I | 25 | 250+5 | 50:1 |
|  |  |  | I | 25 | 100+10 | 10:1 |
|  | D | 250 | H | 50 | 100+10 | 10:1 |
| P. aeruginosa | A | 500 | K | 100 | 250+10 | 25:1 |
|  | A |  | I | 50 | 100+10 | 10:1 |
|  | B | 500 | I | 50 | 100+25 | 4:1 |
|  | D | 500 | H | 100 | 100+25 | 4:1 |
| Candida albicans | B | 500 | K | 250 | 100+50 | 2:1 |
|  | C | 100 | N | 50 | 25+5 | 5:1 |
| Penicillium canerunense | B | 250 | K | 50 | 100+25 | 4:1 |
|  | C | 100 | H | 1,000 | 25+100 | 1:4 |
|  | A |  | I | 25 | 25+10 | 2.5:1 |
| Asp. niger | A | 500 | G | 100 | 50+50 | 1:1 |
|  | D | 500 | I | 25 | 100+5 | 20:1 |

EXAMPLE III

In this example and the following example, the rapid antimicrobic action is more important than the undesirable odor or other side effects of the aldehydes. The two test methods are derived from the standard tests of chemical disinfectants of Deutsche Gesellschaft für Hygiene and Mikrobiologie, 1959.

The suspension test was effected by pipette measuring 0.1 ml. of a suspension of *Staphylococcus aureus* having a bacteria count of about $10^9$/ml. into small petri dishes at 18–21° C. and 10 ml. of the test compositions at different dilutions were added thereto. After specific periods of time, a loop full of material was taken therefrom and used to inoculate 10 ml. of Merck Standard I bouillon in test tubes. Withdrawals were made at the following periods: 1′, 2.5′, 5′, 10′, 20′, 30′, 60′, 90′ and 120′. The said bouillon contained 1% Tween 80 (polyoxyethylene sorbitane mono oleate) and 0.5% histidine to prevent any bacterial after effects. The concentration and time period at which 100% kill of the germs was obtained was determined by incubating the test tubes for 8 days at 37° C. after which macroscopic examination for growth was made. The tubes which remained clear were inoculated with *Staphylococcus aureus* to exclude a possible growth arresting action. The results are set forth in Table IV.

TABLE IV

| Disinfectant | Starting quantity | Killing time in minutes |
|---|---|---|
| A | 3,600 | >120 |
| I | 240 | >120 |
| A plus I | 3,600+240 | 60 |
| A plus I | 1,800+180 | 90 |

EXAMPLE IV

The bactericidal effect in the germ carrier test was determined as follows: 1 cm. square sterile swatches of cambric were inoculated with *Staphylococcus aureus* prepared as in Example III by adding the swatches to the petri dishes. After periods of 2.5', 5', 10', 20', 30', 45', 60', 90' and 120', the swatches were removed and rinsed twice in sterile water containing 1% Tween 80 and 0.1% of sodium sulfite to prevent bacterial after effect. The swatches were placed in test tubes with Merck Standard I bouillon containing 1% Tween 80 and 0.5% histidine. The tubes were incubated at 37° C. for 8 days and then were macroscopically examined for growth. The results were obtained by smears on solid culture media. The tubes which had remained clear were inoculated with *Staphylococcus aureus* to prevent a possible growth arresting action. The results obtained are in Table V.

TABLE V

| Disinfectant | Starting quantity | Killing time in minutes |
|---|---|---|
| A | 15,000 | >120 |
| A | 10,000 | >120 |
| H | 1,000 | >120 |
| H | 500 | >120 |
| I | 1,000 | 60 |
| I | 500 | 90 |
| A plus H | 15,000+1,000 | 30 |
| A plus H | 15,000+500 | 45 |
| A plus H | 10,000+1,000 | 90 |
| A plus H | 10,000+500 | 120 |
| A plus I | 15,000+1,000 | 5 |
| A plus I | 15,000+500 | 10 |
| A plus I | 10,000+1,000 | 20 |
| A plus I | 10,000+500 | 45 |

Antimicrobic compositions

Disinfectants for installations
and instruments:                                        Parts by wt.
    Formalin (35% formaldehyde solution) _____   30
    1-bromo-1-nitro-3,3,3-trichloropanol-(2) _____    3
    Water _____  67

Disinfectant cleansing agent:
    Formalin (35% formaldehyde solution) _____   40
    1-bromo-1-nitro-3,3,3-trichloropropanol(2) ____    2
    Coconut fatty alcohol+10 mole of ethylene ____     5
    Dodecyl benzene sulfonate _____     5
    Water _____  48

Disinfectant scouring agent:
    Dodecyl benzene sulfonate (30% wash active
        substance) _____   20
    Sodium sulfate _____    2
    Finely ground pumice _____   12
    Finely ground quartz powder _____   60
    Formalin (35% formaldehyde solution) _____    5
    2-bromo-2-nitro-propanediol-(1,3) _____    1

The said compositions can be easily altered by using aldehydes other than formaldehyde or other nitro alcohols in varying portions.

The compositions of the invention have the advantage that the concentration of the aldehyde can be greatly lowered without effecting the antimicrobic activity which is particularly useful when the aldehyde has harmful or undesired secondary effects. Moreover, the compositions have the essential advantage that the time for 100% kill of bacteria for aldehydes alone can be greatly shortened by the addition of a small amount of the nitro alcohol.

Various modifications of the compositions and method of the invention may be made without departing from the spirit or scope thereof and it is to be understood that the invention is to be limited only as defined in the appended claims.

We claim:

1. A synergistic antifungal and antibacterial composition comprising a saturated aliphatic mono- or di-aldehyde having 1 to 6 carbon atoms and a straight chain aliphatic nitro alcohol of 2 to 5 carbon atoms having at least one nitro group and which may be substituted with a substituent selected from the group consisting of chlorine, bromine, lower alkyl hydroxy lower alkyl of 1 to 7 carbon atoms, phenyl, chlorophenyl and nitrophenyl, the weight ratio of aldehyde to nitroalcohol being 50:1 to 1:4.

2. The composition of claim 1 wherein the aldehyde is formaldehyde.

3. The composition of claim 1 wherein the nitroalcohol is substituted with at least one halogen selected from the group consisting of chlorine and bromine.

4. The composition of claim 1 wherein the nitro alcohol is substituted with a member selected from the group consisting of lower alkyl and hydroxy lower alkyl of 1 to 7 carbon atoms.

5. The composition of claim 1 wherein the nitro alcohol is substituted with a member selected from the group consisting of phenyl, chlorophenyl and nitrophenyl.

6. The composition of claim 1 wherein the nitro alcohol is 1-bromo-1-nitro-3,3,3-trichloropanol-2.

7. The composition of claim 6 wherein the aldehyde is formaldehyde.

8. A method of killing fungi and bacteria which comprises applying to fungi and bacteria a lethal amount of the composition of claim 1.

9. The method of claim 8 wherein the nitroalcohol is 1-bromo-1-nitro-3,3,3-trichloropropanol-2 and the aldehyde is formaldehyde.

References Cited

UNITED STATES PATENTS 2,931,839   4/1960   Kundiger _____ 260—633

FOREIGN PATENTS 700,115   11/1953   Great Britain _____ 424—329
1,057,131   2/1967   Great Britain _____ 424—343

ALBERT T. MEYERS, Primary Examiner
V. D. TURNER, Assistant Examiner

U.S. Cl. X.R.

424—333, 343